United States Patent
Namiki (10) Patent No.: US 12,162,152 B2
(45) Date of Patent: Dec. 10, 2024

(54) MACHINE-LEARNING DEVICE

(71) Applicant: FANUC CORPORATION, Yamanashi (JP)

(72) Inventor: Yuta Namiki, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 235 days.

(21) Appl. No.: 17/905,319

(22) PCT Filed: Feb. 26, 2021

(86) PCT No.: PCT/JP2021/007318
§ 371 (c)(1),
(2) Date: Aug. 30, 2022

(87) PCT Pub. No.: WO2021/177159
PCT Pub. Date: Sep. 10, 2021

(65) Prior Publication Data
US 2023/0311308 A1    Oct. 5, 2023

(30) Foreign Application Priority Data
Mar. 5, 2020  (JP) ................. 2020-037524

(51) Int. Cl.
*B25J 9/16*     (2006.01)
*B25J 19/02*    (2006.01)

(52) U.S. Cl.
CPC .......... *B25J 9/163* (2013.01); *B25J 9/161* (2013.01); *B25J 9/1697* (2013.01); *B25J 19/023* (2013.01)

(58) Field of Classification Search
CPC . B25J 9/163; B25J 9/161; B25J 9/1697; B25J 19/023; G05B 2219/39271; G05B 2219/40607; G05B 2219/40613
(Continued)

(56) References Cited

U.S. PATENT DOCUMENTS

2017/0252922 A1* 9/2017 Levine ................. G06N 3/084
2019/0091869 A1* 3/2019 Yamazaki ............. B25J 15/08

FOREIGN PATENT DOCUMENTS

| CN | 108955525 A | 12/2018 |
|----|-------------|---------|
| JP | 2018-151843 A | 9/2018 |

(Continued)

OTHER PUBLICATIONS

International Search Report issued in PCT/JP2021/007318; mailed May 18, 2021.

*Primary Examiner* — B M M Hannan
(74) *Attorney, Agent, or Firm* — Studebaker & Brackett PC (57) ABSTRACT

Provided is a machine-learning device which can efficiently perform machine learning. The machine-learning device comprises: a vision execution unit which captures an image of an object W by means of a visual sensor by executing a vision execution command from a robot program, and detects or determines the object W from the captured image; a result acquisition unit which acquires the detection result or the determination result for the object W by executing a result acquisition command from the robot program; an additional annotation unit which gives a label to the captured image on the basis of the detection result or the determination result for the image of the object W by executing an annotation command from the robot program, and acquires new training data; and a learning unit which performs machine learning by using the new training data by executing a learning command from the robot program.

8 Claims, 8 Drawing Sheets

(58) Field of Classification Search
 USPC .......................................................... 700/250
 See application file for complete search history.

(56) References Cited

FOREIGN PATENT DOCUMENTS

| | | |
|---|---|---|
| JP | 2018-202550 A | 12/2018 |
| JP | 2019-048365 A | 3/2019 |
| JP | 2019-508273 A | 3/2019 |
| JP | 2019-058960 A | 4/2019 |
| JP | 2019-060780 A | 4/2019 |
| JP | 2019-159819 A | 9/2019 |
| JP | 2019-185422 A | 10/2019 |

* cited by examiner

MACHINE-LEARNING DEVICE

TECHNICAL FIELD

The present invention relates to a machine-learning device.

BACKGROUND ART

Conventionally, in robot systems, machine learning utilizing machine-learning devices has been used as a method for detecting or inspecting objects from images (for example, see Patent Document 1). In a robot system using machine learning, there is a need to perform work known as annotation as a preliminary step of training, in which labels indicating whether there are any defects in the image, whether detection positions are correct, etc. are associated with the image data. Annotation is performed by a user checking the images one by one to determine whether or not there are any defects in the objects in the images.

Patent Document 1: Japanese Unexamined Patent Application, Publication No. 2018-151843

DISCLOSURE OF THE INVENTION

Problems to be Solved by the Invention

Annotation of images is normally performed by a user. However, it takes a long time for a user to add labels to all of the training data. Further, if training is started once all of the training data has been collected, it will take time for the system used in the machine learning to start up. There is thus a demand for efficient machine learning in a machine-learning device for a robot.

Means for Solving the Problems

A machine-learning device according to the present disclosure is a machine-learning device for a robot using a visual sensor, the machine-learning device including: a program setting unit that sets a vision execution command, a result acquisition command, an annotation command, and a learning command in a robot program for the robot; a vision execution unit that captures an image of an object by the visual sensor by executing the vision execution command from the robot program, and detects or determines the object from the captured image; a result acquisition unit that acquires a detection result or a determination result for the object by executing the result acquisition command from the robot program; an additional annotation unit that assigns a label to the captured image on the basis of the detection result or the determination result for the image of the object by executing the annotation command from the robot program, and acquires new training data; and a learning unit that performs machine learning using the new training data by executing the learning command from the robot program.

A machine-learning device according to the present disclosure is a machine-learning device for a robot using a visual sensor, the machine-learning device including: a program setting unit that sets at least one selected from a vision execution command, a result acquisition command, an annotation command, and a learning command in a robot program for the robot; a vision execution unit that captures an image of an object by the visual sensor by executing the robot program, and detects or determines the object from the captured image; a result acquisition unit that acquires a detection result or a determination result for the object by executing the robot program; an additional annotation unit that assigns a label to the captured image on the basis of the detection result or the determination result for the image of the object by executing the robot program, and acquires new training data; and a learning unit that performs machine learning using the new training data by executing the robot program.

EFFECTS OF THE INVENTION

According to the present invention, machine learning can be performed efficiently. BRIEF DESCRIPTION OF THE DRAWINGS

PREFERRED MODE FOR CARRYING OUT THE INVENTION

Figure 1:
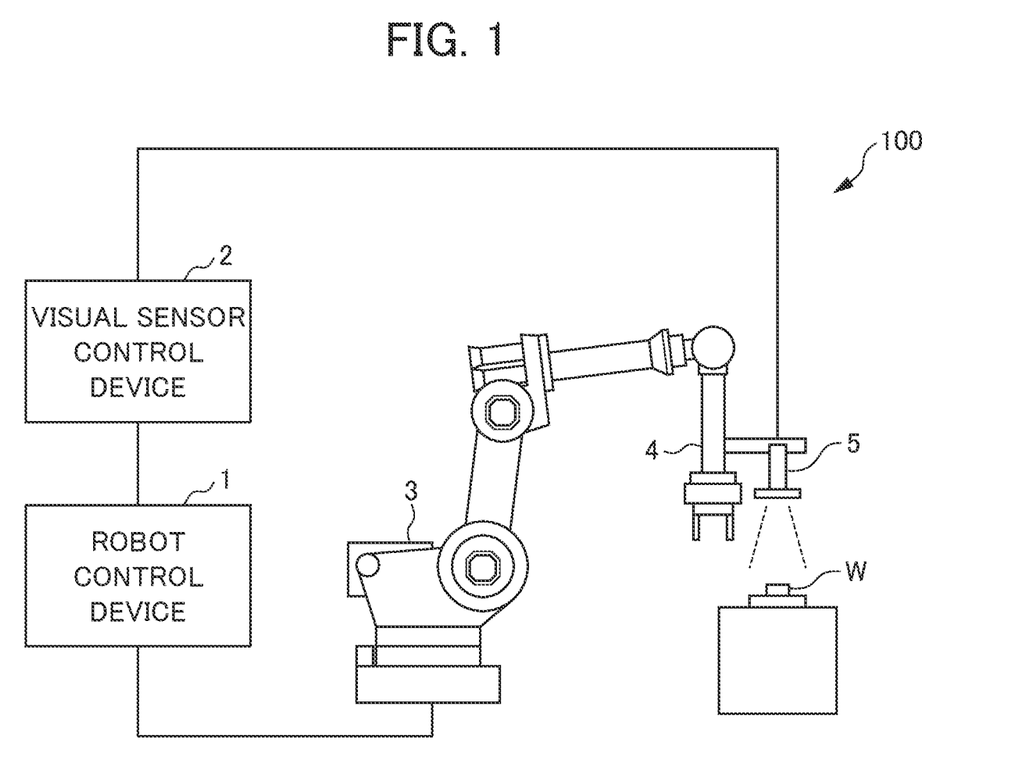
FIG. 1 illustrates a configuration of a robot system.

An example of an embodiment of the present invention is described below. FIG. 1 illustrates a configuration of a robot system 100. As illustrated in FIG. 1, the robot system 100 is provided with a robot control device 1, a visual sensor control device 2, a robot 3, an arm 4, and a visual sensor 5.

A hand or a tool is mounted to the end part of the arm 4 of the robot 3. The robot 3 performs work such as handling or processing of an object W under the control of the robot control device 1. In addition, the visual sensor 5 is mounted to the end part of the arm 4 of the robot 3. The visual sensor 5 is not necessarily mounted to the robot 3, but may, for example, be secured and installed at a predetermined position.

The visual sensor 5 captures images of the object W under the control of the visual sensor control device 2. The visual sensor 5 may be a two-dimensional camera having an optical system including a lens and an image capture element constituted by a charge coupled device (CCD) image sensor, a stereo camera capable of three-dimensional measuring, or the like.

The robot control device 1 executes a robot program for the robot 3 to control operation of the robot 3. At this time, the robot control device 1 compensates the operation of the robot 3 so that the robot 3 performs a predetermined work with respect to a position of the object W detected by the visual sensor control device 2.

Figure 2:
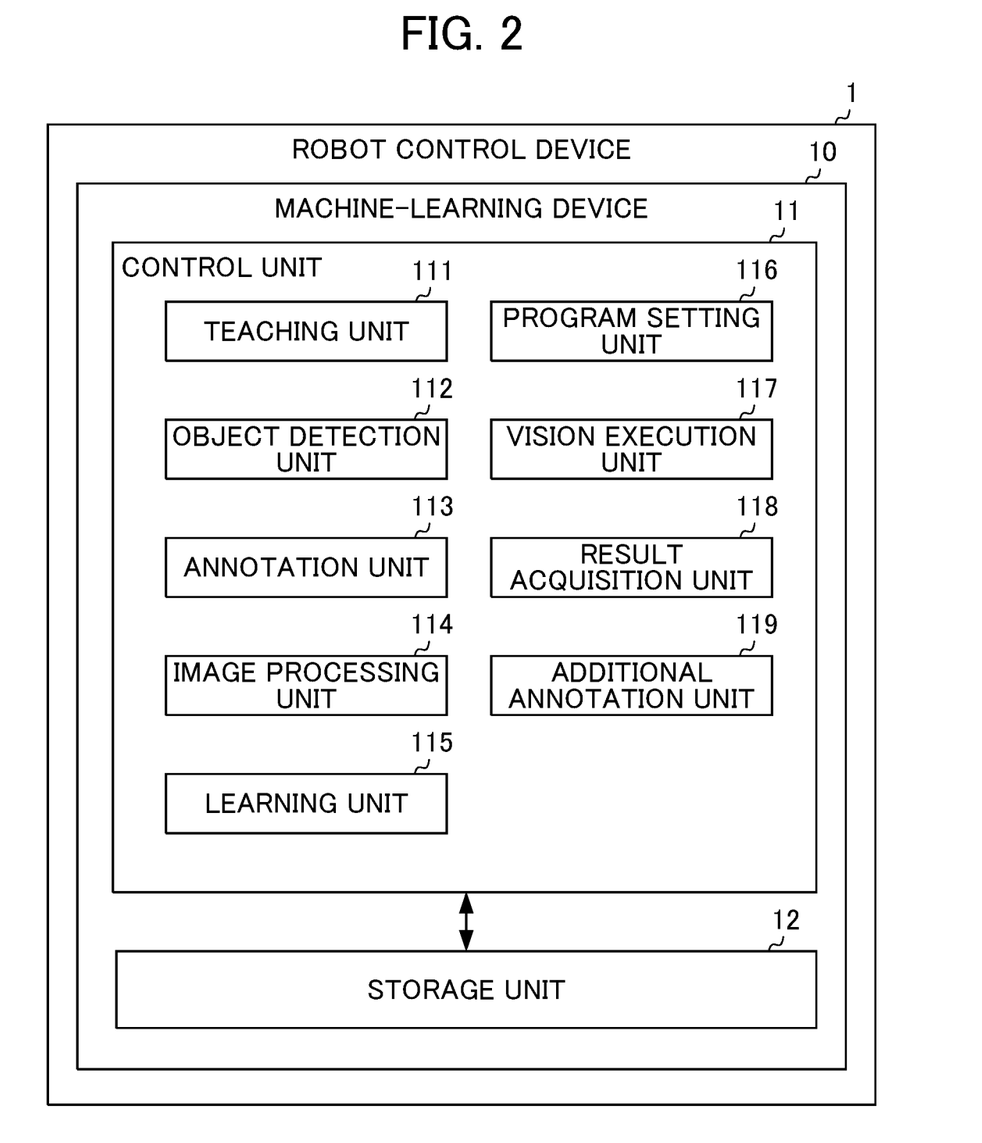
FIG. 2 illustrates a configuration of a robot control device.

FIG. 2 illustrates a configuration of the robot control device 1. The robot control device 1 is provided with a machine-learning device 10. It should be noted that the robot control device 1 has a common configuration for controlling the robot 3, which is omitted here for the sake of simplicity. The machine-learning device 10 is a device for performing machine learning for the robot 3. The machine-learning device 10 is provided with a control unit 11 and a storage unit 12.

The control unit 11 is a processor such as a central processing unit (CPU), which realized various functions by executing a program stored in the storage unit 12.

The control unit 11 is provided with a teaching unit 111, an object detection unit 112, an annotation unit 113, an image processing unit 114, a learning unit 115, a program setting unit 116, a vision execution unit 117, a result acquisition unit 118, and an additional annotation unit 119.

The storage unit 12 is a storage device such as a hard disk drive or a solid-state drive (SSD) that stores a read only memory (ROM) and a random-access memory (RAM) storing an operating system (OS) and application programs, etc., and other various kinds of information. The storage unit 12 stores, for example, a robot program and other various kinds of information.

Figure 3:
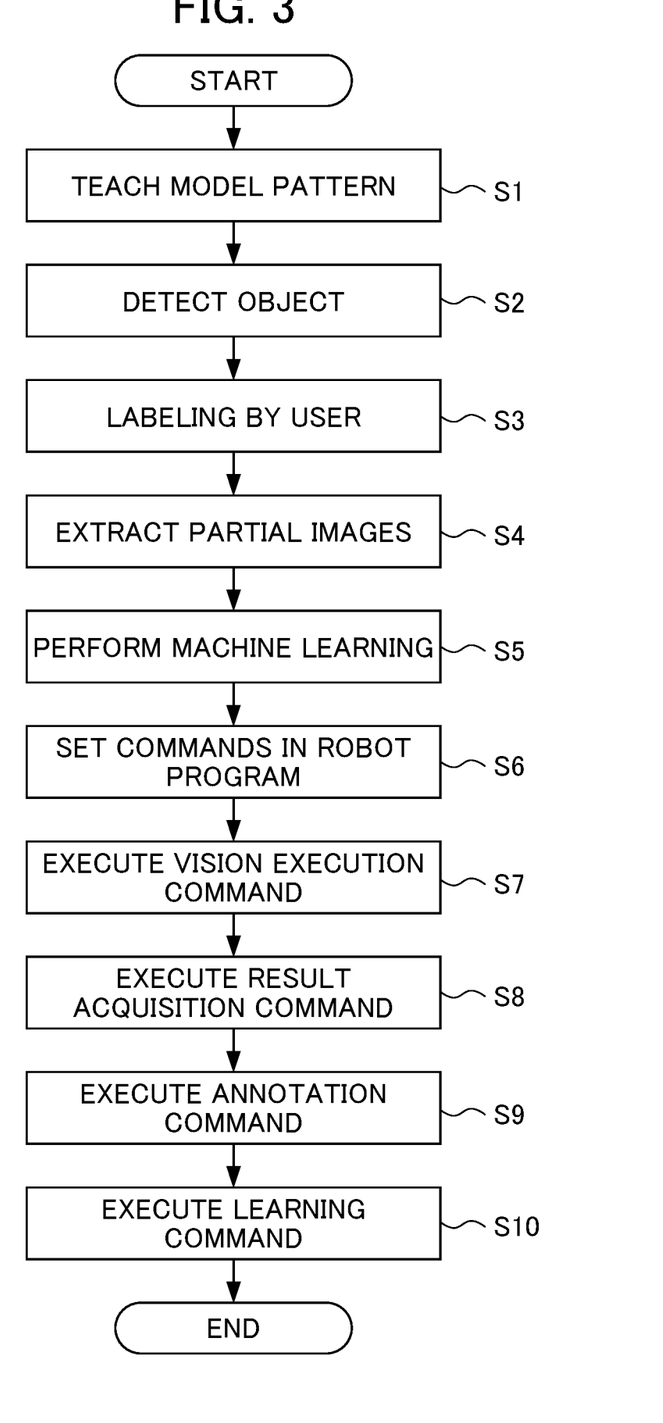
FIG. 3 is a flowchart illustrating a process flow of a machine-learning device.
Figure 4:
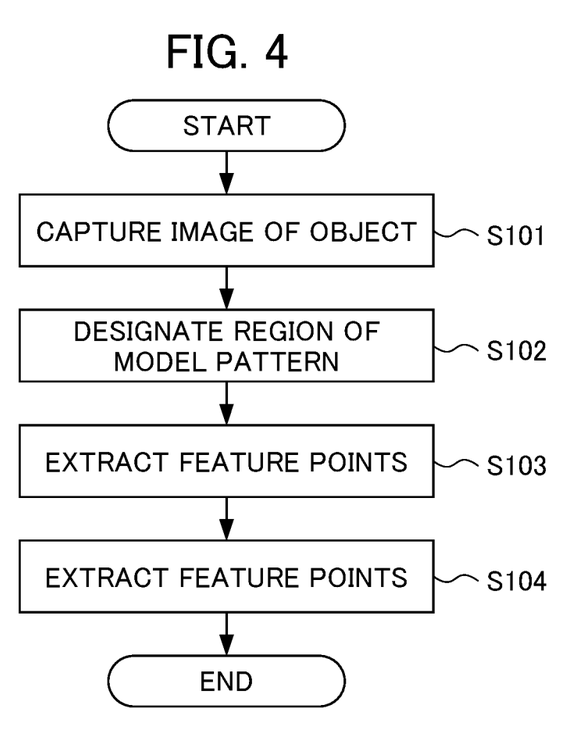
FIG. 4 is a flowchart illustrating a process flow of training a model pattern.
Figure 5:
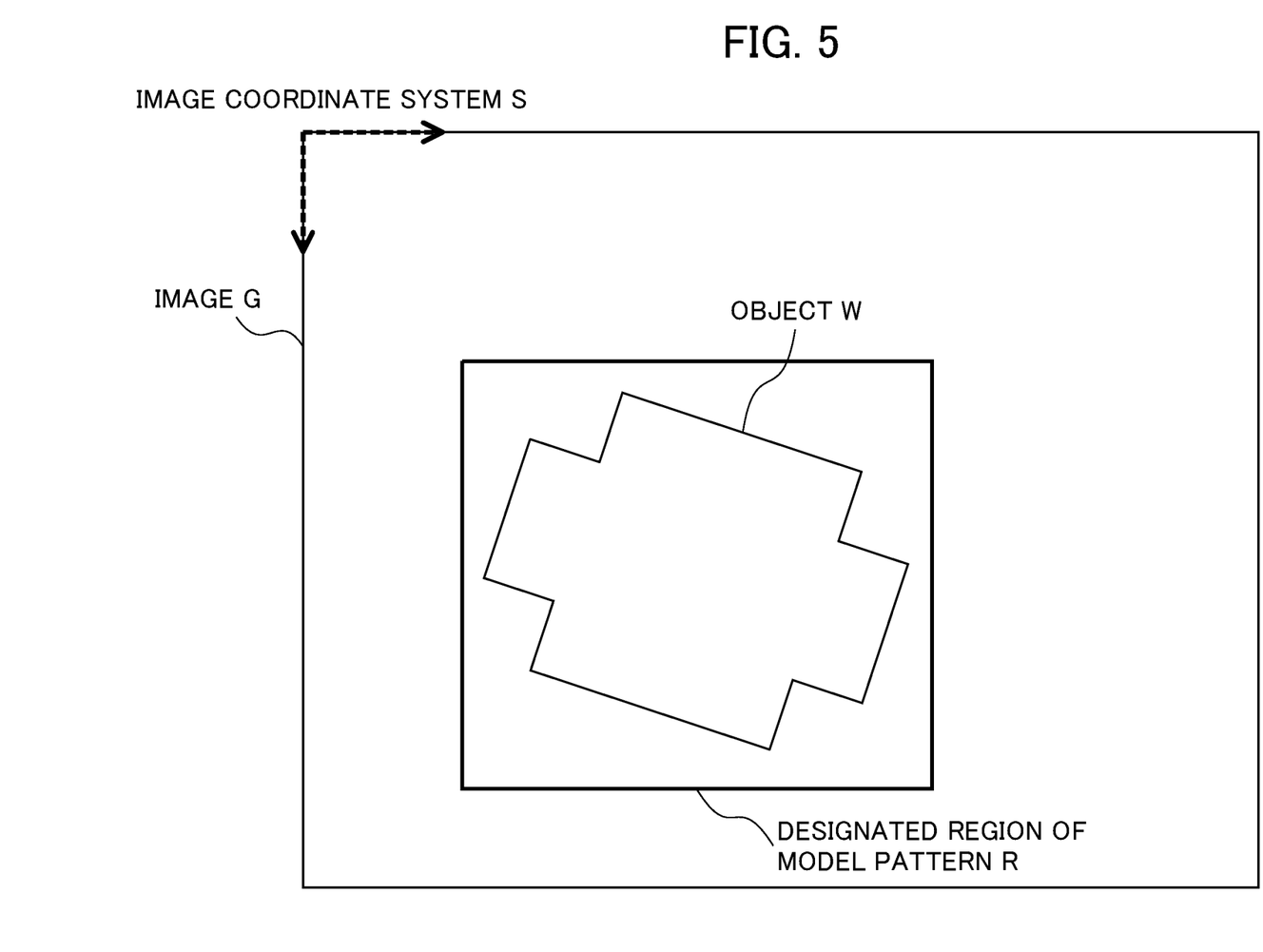
FIG. 5 illustrates an example of training a model pattern.

FIG. 3 is a flowchart illustrating a process flow of the machine-learning device 10. At Step S1, the teaching unit 111 teaches a model pattern representing features of an image of the object W. FIG. 4 is a flowchart illustrating a process of teaching the model pattern. FIG. 5 illustrates an example of teaching the model pattern.

At Step S101 an object W to be taught as a model pattern is arranged in the field of vision of the visual sensor 5, and an image G of the object W is captured. The positional relationship between the visual sensor 5 and the object W is preferably made to be the same as when detecting the object W.

At Step S102, the teaching unit 111 designates a region including the object W in the captured image G as a rectangular or circular model pattern designated region R.

At Step S103, the teaching unit 111 extracts edge points in the range of the model pattern designated region as feature points and obtains physical quantities such as the positions, orientations (brightness gradient direction), brightness gradient size, etc. of the edge points. In addition, the teaching unit 111 defines a model pattern coordinate system in the designated region and converts the positions and orientations of the edge points from values expressed by an image coordinate system S into values expressed by the model pattern coordinate system.

At Step S104, the physical quantities of the extracted edge points are stored in the storage unit 12 as feature points constituting the model pattern. It should be noted that in the present embodiment, the edge points are used as feature points, but it is also possible to use other kinds of feature points, such as those of the well-known SIFT algorithm.

Returning to FIG. 3, at Step S2, the object detection unit 112, using the model pattern, detects images of the object W from one or more input images including the object W.

Specifically, first, one or more input images including images of the object W are prepared. Then, the object detection unit 112, using the model pattern, detects images of the object W from each of the one or more input images including the object W.

Figure 6:
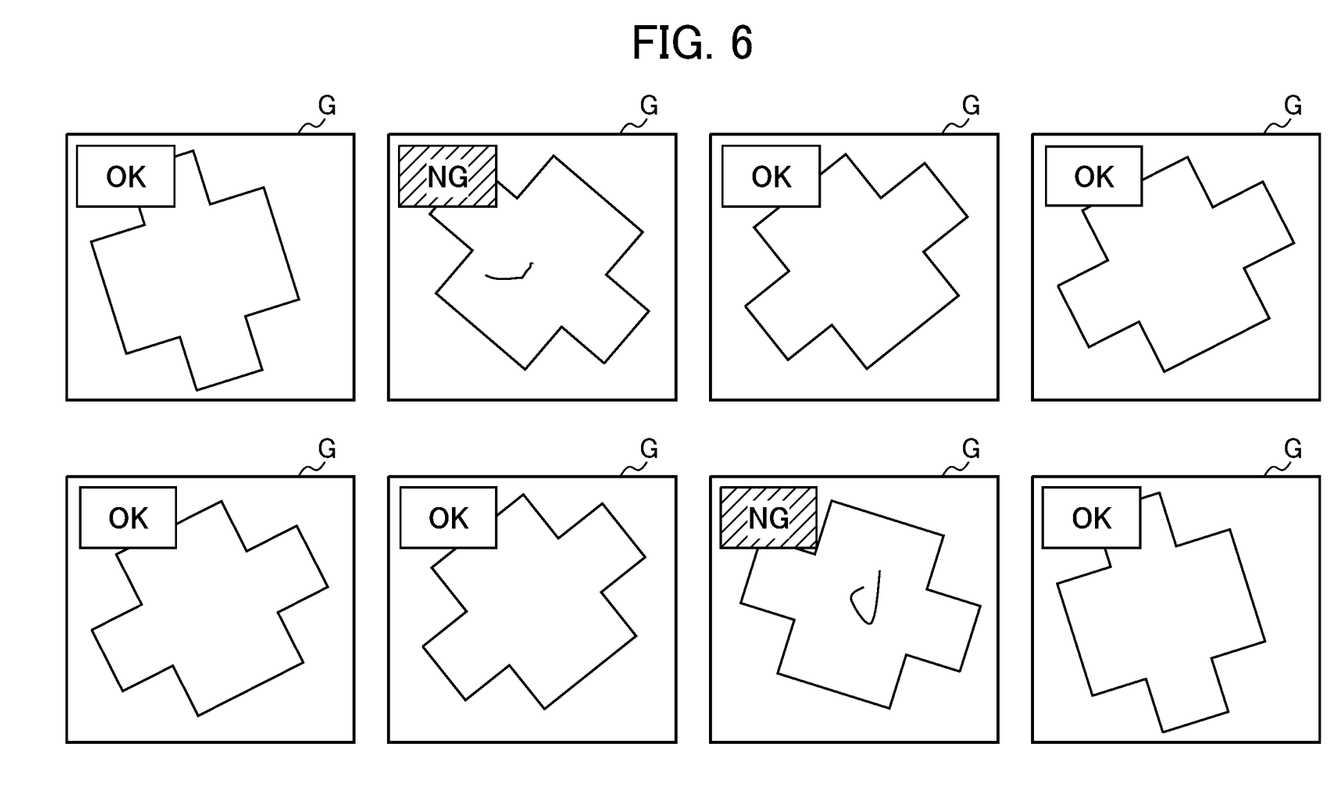
FIG. 6 illustrates an example of labeling a detection result.

At Step S3, the annotation unit 113 labels (annotates) the detection result for the object W on the basis of a determination of the detection result by a user. Specifically, the detection result for the object W at Step S2 is displayed on a display device or the like connected to the robot control device 1. The user visually checks the detection result and labels the detection result as OK, POOR, etc. FIG. 6 illustrates an example of labeling the detection result. In the example of FIG. 6, the annotation unit 113 labels two images G as POOR, and labels six images G as OK.

For example, the user labels the detection result as POOR when the detection result is an erroneous detection or defective. Alternatively, the user may label the detection result as OK when the detection result is equal to or greater than a predetermined threshold value, and label the detection result as POOR when the detection result is less than the predetermined threshold value. Alternatively, labels automatically assigned by the machine-learning device 10 may be modified by the user. In the above description, a classification having the two classes of OK and POOR is used for the labels, but a classification having three or more classes may also be used.

Figure 7:
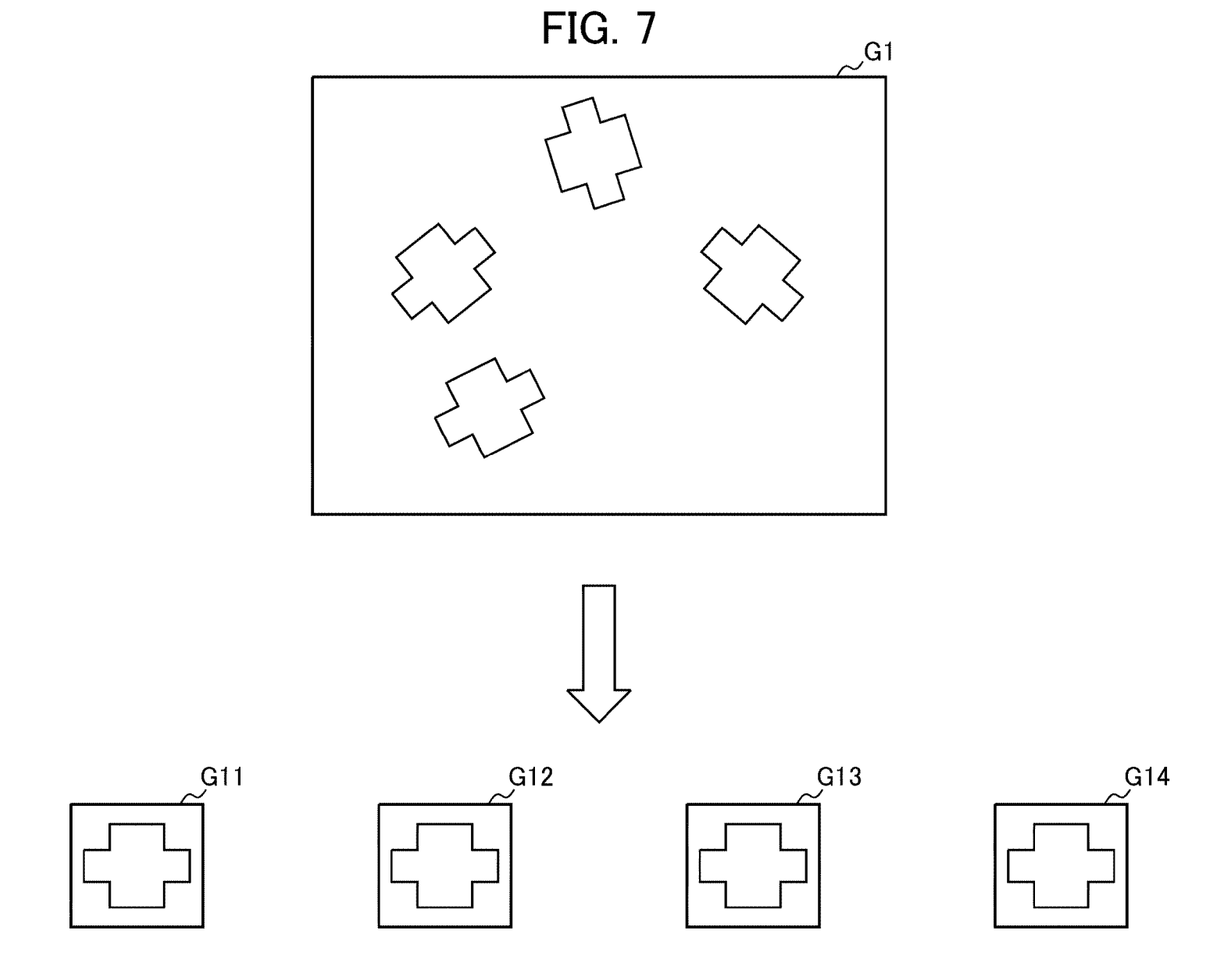
FIG. 7 illustrates an example of extracting partial images.

At Step S4, the image processing unit 114 associates images based on the input images with labels to make training data of the images based on the input images and the labels. For example, the image processing unit 114 extracts partial images including the object W from the input images, and associates the partial images with labels to make training data of the partial images and labels. Specifically, the image processing unit 114 extracts (cuts out) partial images of predetermined regions at positions and orientations detected from the input images. FIG. 7 illustrates an example of extracting partial images. In the example of FIG. 7, the image processing unit 114 extracts partial images G11, G12, G13, and G14 from an image G1. Then, the image processing unit 114, associates the extracted partial images with the labels assigned at Step S3 to make training data of the partial images and the labels.

Figure 8:
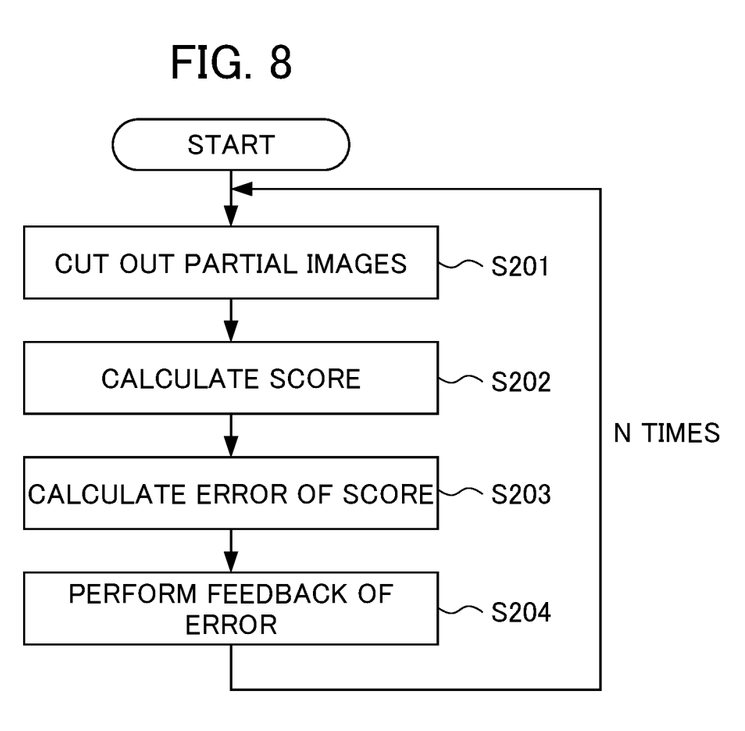
FIG. 8 is a flowchart illustrating a process of machine learning.

At Step S5, the learning unit 115 performs machine learning using the training data. Specifically, the learning unit 115 performs machine learning using a training data set that is a collection of training data. FIG. 8 is a flowchart illustrating a process of the machine learning. It should be noted that a support vector machine (SVM) or a neural network may be used as the learning model.

At Step S201, the image processing unit 114 extracts (cuts out) partial images including the object W from the input images, and associates the partial images with the labels to make training data of the partial images and the labels. At Step S202, the learning unit 115 inputs pixel values of the partial images into the learning model and calculates a matching degree (score). Here, the matching degree is a value from 0 to 1.

At Step S203, the learning unit 115 calculates an error from the calculated matching degree (score), with a correct label being 1.0 and an incorrect label being 0.0. At Step S204, the learning unit 115 performs feedback of the error in the learning model to update the parameters of the learning model. Then, the learning unit 115 repeats this process the same number of times as the number of detection results (N results) used in the learning.

Returning to FIG. 3, at Step S6, the program setting unit 116 sets a vision execution command, a result acquisition command, an annotation command, and a learning command in the robot program for the robot 3. The program setting unit 116 may set at least one selected from the vision execution command, the result acquisition command, the annotation command, and the learning command in the robot program.

Here, the vision execution command (VISION_FIND) captures an image of the object W by means of the visual sensor 5 and detects or determines the object W from the captured image. The result acquisition command (VISION_ GET_RESULT) acquires the detection result or the determination result for the object W. The annotation command (VISION_ANNOTATE) labels the captured image on the basis of the detection result or the determination result for the image of the object W. The learning command (VISION_ LEARNING) performs machine learning using the training data.

By setting these commands for machine learning in the robot program in this way, the machine-learning device 10 can call these commands from the robot program.

At Step S7, by executing the vision execution command from the robot program, the vision execution unit 117 captures an image of the object W by means of the visual sensor 5, and detects or determines the object W from the captured image. It should be noted that in the present embodiment, detection of the object W means detecting a position and orientation of the object W and acquiring the detection result, and determination of the object W means inspecting the object W and acquiring a determination result such as OK/POOR, type, etc.

At Step S8, by executing the result acquisition command from the robot program, the result acquisition unit 118 acquires the detection result or the determination result for the object W.

At Step S9, by executing the annotation command from the robot program, the additional annotation unit 119 labels the captured image on the basis of the detection result or the determination result for the image of the object W to acquire new training data. Because the machine-learning device 10 is able to execute the annotation command from the robot program in this way, the machine-learning device 10 can perform optimal annotation for the robot system 100 that uses the robot 3.

At Step S10, by executing the learning command from the robot program, the learning unit 115 performs machine learning using the new training data acquired at Step S9.

The robot program including the vision execution command, the result acquisition command, the annotation command, and the learning command described above may be, for example, as described below. Below, the descriptions in brackets indicate the operations of the robot program.

MOVE_TO_PX (move to position X)
    VISION_FIND "VP1" (execute vision program VP1)
    VISION_GET_RESULT "VP1" DATA[1] (acquire determination result from vision program VP1)
    IF DATA[1]. CONFIDENCE<30 (if the confidence degree of the determination result is lower than 30)
    VISION_ANNOTATE (DATA[1], DATA[1]. LABEL) (add training data as determination result)
    ENDIF
    VISION_LEARNING (execute learning)

The robot program illustrated by way of example above uses a confidence degree. By using training data with a low confidence degree for learning, the precision of the learning model can be further improved. The confidence degree is calculated on the basis of a loss function. The confidence degree can be calculated using a known method.

The annotation command may change the label depending on whether or not the robot 3 has successfully gripped the object W, on the basis of the detection result for the image of the object W. In this case, the robot program executes, for example, the following process.

(1) The robot 3 is moved to a position X.
(2) The vision execution command is executed to detect the object.
(3) The result acquisition command is executed to acquire the detection result.
(4) The arm 4 of the robot 3 is moved to the detection position.
(5) The object W is gripped by the arm 4.
(6) It is determined whether or not gripping was successful.
(7) If gripping was successful, the annotation command assigns the label 1 (gripping successful).
(8) If gripping failed, the annotation command assigns the label 0 (gripping failed).
(9) The processes of (2) to (8) are repeated.
(10) The learning command is executed. By executing such a process, the machine-learning device 10 can obtain a learning model corresponding to whether or not gripping of the object has succeeded, using the image and the detection result.

The object W may be inspected by another device (for example, a highly precise inspection device). In turn, the annotation command may label the inspection result for the object W inspected by the other device. In this case, the robot program executes, for example, the following process.

(1) The robot 3 is moved to a position X.
(2) The vision execution command is executed to detect the object.
(3) The result acquisition command is executed to acquire the result.
(4) The other device performs a determination (inspection). A user checks the determination result.
(5) The annotation command is executed to input the determination result of the other device into the training data.
(6) The learning command is executed. By executing such a process, the machine-learning device 10 can obtain a learning model that determines the object W from an image. After learning, the machine-learning device 10 can perform the determination with only the learning model, without using the determination result of the other device. The annotation command may label the detection result when the score of the detection result for the object W is less than a predetermined threshold value. In this case, the robot program executes, for example, the following process.

(1) The robot 3 is moved to a position X.
(2) The vision execution command is executed to detect the object.
(3) The result acquisition command is executed to acquire the result.
(4) It is determined whether or not the score of the detection result is less than the predetermined threshold value.
(5) If the score of the detection result is less than the predetermined threshold value, the annotation command inputs the detection position into the training data.
(6) The learning command is executed. By executing such a process, the machine-learning device 10 can obtain a learning model that returns the position of the object W from an image.

As described above, according to the present embodiment, the machine-learning device 10 for a robot 3 using a visual sensor 5 is provided with a program setting unit 116 that sets a vision execution command, a result acquisition command, an annotation command, and a learning command in a robot program for the robot 3, a vision execution unit 117 that captures an image of an object W by the visual sensor 5 by executing the vision execution command from the robot program, and detects or determines the object W from the captured image, a result acquisition unit 118 that acquires the detection result or the determination result for the object W by executing the result acquisition command from the robot program, an additional annotation unit 119 that assigns a label to the captured image on the basis of the detection result or the determination result for the image of the object W by executing the annotation command from the robot program, and acquires new training data, and a learning unit 115 that performs machine learning using the new training data by executing the learning command from the robot program.

This allows the machine-learning device 10 to perform annotation and machine learning while operating the robot by the robot program, and can thus efficiently perform machine learning. Therefore, use of the machine-learning device 10 allows for quick startup of the robot system 100.

The annotation command may change the label depending on whether or not the robot 3 has successfully gripped the object W, on the basis of the detection result for the image of the object W. By executing such a process, the machine-learning device 10 can obtain a learning model corresponding to whether or not gripping of the object has succeeded, using the image and the detection result. Therefore, the machine-learning device 10 can have workpieces be gripped in order of the probability that the robot 3 is able to grip the workpieces.

The object W may be determined by another device, and the annotation command may assign a label to a determination result for the object W determined by the other device. By executing such a process, the machine-learning device 10 can obtain a learning model that determines the object W from an image. After learning, the machine-learning device 10 can perform the determination with only the learning model, without using the determination result of the other device.

The annotation command may assign the label to the detection result when the score of the detection result for the object W is less than a predetermined threshold value. By executing such a process, the machine-learning device 10 can obtain a learning model that returns the position of the object W from an image. Therefore, the machine-learning device 10 can efficiently perform machine learning using such a learning model.

The machine-learning device 10 is further provided with a teaching unit 111 that teaches a model pattern representing features of an image of the object W, an object detection unit 112 that detects, using the model pattern, an image of the object W from one or more input images including the object W, an annotation unit 113 that, on the basis of a detection result for the object W, assigns a label to the detection result, an image processing unit 114 that associates the image based on the input images with the label to make training data of the image based on the input images and the label, and a learning unit 115 that performs machine learning using the training data. This allows the machine-learning device 10 to perform appropriate machine learning.

In the embodiment described above, a case wherein one machine-learning device 10 is used has been described, but a machine-learning system provided with a plurality of machine-learning devices 10 is also possible. When a plurality of machine-learning devices 10 are present, a learning model stored in one of the machine-learning devices 10 may be shared with other machine-learning devices 10. By having the learning model be shared between a plurality of machine-learning devices 10, learning can be distributed among the machine-learning devices 10, whereby the machine-learning system can improve learning efficiency.

An embodiment of the present invention has been described above, but the present invention is not limited to the above embodiment. Further, the effects described in the present embodiment are merely a list of the most preferable effects caused by the present invention, and the effects of the present invention are not limited to those described in the present embodiment.

EXPLANATION OF REFERENCE NUMERALS

1 Robot control device
2 Visual sensor control device
3 Robot
4 Arm
5 Visual sensor
10 Machine-learning device
11 Control unit
12 Storage unit
111 Teaching unit
112 Object detection unit
113 Annotation unit
114 Image processing unit
115 Learning unit
116 Program setting unit
117 Vision execution unit
118 Result acquisition unit
119 Additional annotation unit

The invention claimed is:

1. A machine-learning device for a robot using a visual sensor, the machine-learning device comprising:
a memory;
instructions stored in the memory; and
a processor,
wherein the instructions, when executed by the processor, cause the processor to:
set a vision execution command, a result acquisition command, an annotation command, and a learning command in a robot program for the robot;
capture an image of an object by the visual sensor by executing the vision execution command from the robot program, and detect or determine the object from the captured image;
acquire a detection result or a determination result for the object by executing the result acquisition command from the robot program;
assign a label to the captured image on a basis of the detection result or the determination result for the image of the object by executing the annotation command from the robot program, and acquires new training data; and
perform machine learning using the new training data by executing the learning command from the robot program.

2. The machine-learning device according to claim 1, wherein the annotation command changes the label depending on whether or not the robot has successfully gripped the object, on the basis of the detection result for the image of the object.

3. The machine-learning device according to claim 1, wherein the object is determined using a visual sensor, and the annotation command assigns the label to a determination result for the object determined by the visual sensor.

4. The machine-learning device according to claim 1, wherein the annotation command assigns the label to the detection result when a score of the detection result for the object is less than a predetermined threshold value.

5. The machine-learning device according to claim 1, wherein the instructions, when executed by the processor, cause the processor to:
teach a model pattern representing features of an image of the object;
detect, using the model pattern, an image of the object from one or more input images including the object;
on the basis of a detection result for the object, assign a label to the detection result; and associate the image based on the one or more input images with the label to make training data of the image based on the one or more input images and the label.

6. A machine-learning system including a plurality of the machine-learning devices according to claim 1, wherein a learning model is shared by processors each provided to a respective one of the plurality of machine-learning devices, and the processors each provided to the respective one of the plurality of machine-learning devices train the shared learning model.

7. A machine-learning device for a robot using a visual sensor, the machine-learning device comprising:
a memory;
instructions stored in the memory; and
a processor,
wherein the instructions, when executed by the processor, cause the processor to:
set at least one selected from a vision execution command, a result acquisition command, an annotation command, and a learning command in a robot program for the robot;
capture an image of an object by the visual sensor by executing the robot program, and detects or determines the object from the captured image;
acquire a detection result or a determination result for the object by executing the robot program;
assign a label to the captured image on a basis of the detection result or the determination result for the image of the object by executing the robot program, and acquire new training data; and
perform machine learning using the new training data by executing the robot program.

8. A machine-learning device for a robot using a visual sensor, the machine-learning device comprising:
a memory;
instructions stored in the memory; and
a processor,
wherein the instructions, when executed by the processor, cause the processor to:
set a vision execution and result acquisition command, and an annotation and learning command in a robot program for the robot;
capture an image of an object by the visual sensor by executing the vision execution and result acquisition command from the robot program, and detect or determine the object from the captured image;
acquire a detection result or a determination result for the object by executing the vision execution and result acquisition command from the robot program;
assign a label to the captured image on a basis of the detection result or the determination result for the image of the object by executing the annotation and learning command from the robot program, and acquire new training data; and
perform machine learning using the new training data by executing the annotation and learning command from the robot program.

* * * * *